W. H. LUCAS.
METAL SAWING MACHINE.
APPLICATION FILED MAY 13, 1915.
1,170,297.
Patented Feb. 1, 1916.
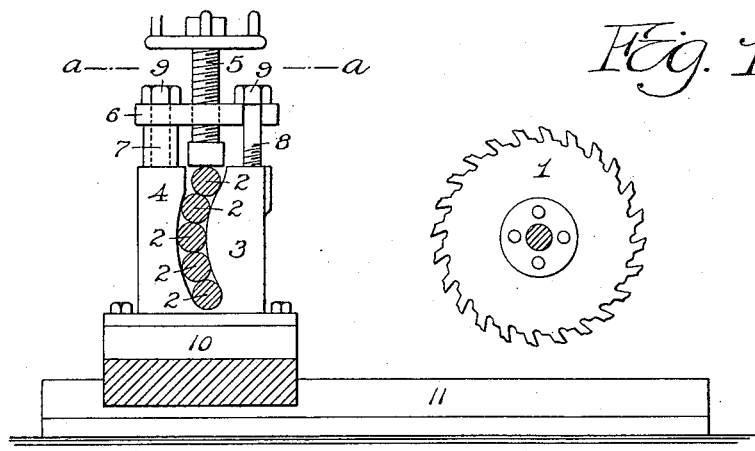
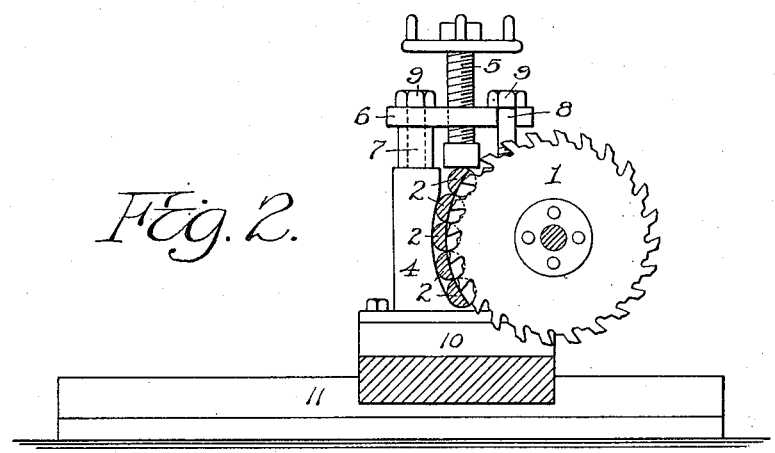
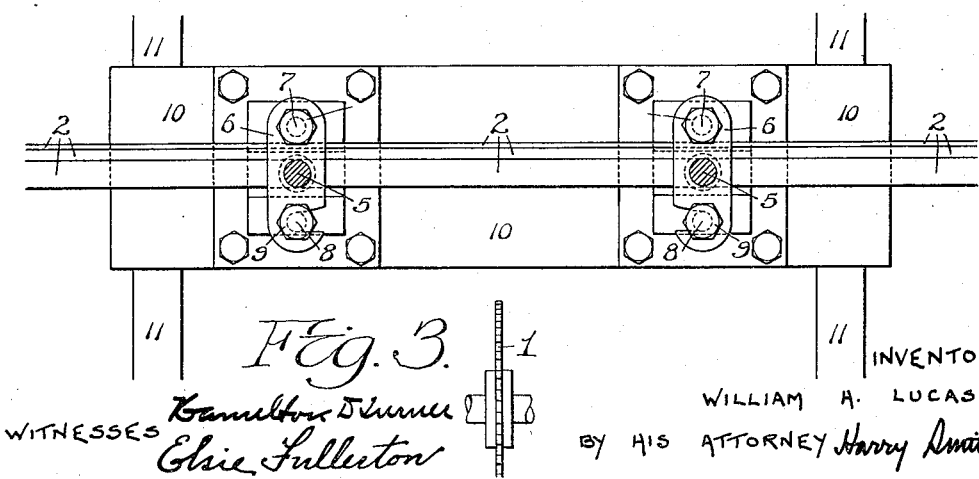
WITNESSES
Hamilton Turner
Elsie Fullerton
INVENTOR
WILLIAM H. LUCAS
BY HIS ATTORNEY Harry Smith

UNITED STATES PATENT OFFICE.

WILLIAM H. LUCAS, OF PHILADELPHIA, PENNSYLVANIA, ASSIGNOR TO FRED F. ESPEN, JACOB ESPEN, JR., AND WILLIAM H. LUCAS, ALL OF PHILADELPHIA, PENNSYLVANIA, TRADING UNDER THE FIRM-NAME OF ESPEN-LUCAS MACHINE WORKS, A COPARTNERSHIP.

METAL-SAWING MACHINE.

1,170,297. Specification of Letters Patent. Patented Feb. 1, 1916.

Application filed May 13, 1915. Serial No. 27,816.

*To all whom it may concern:*

Be it known that I, WILLIAM H. LUCAS, a citizen of the United States, residing in Philadelphia, Pennsylvania, have invented certain Improvements in Metal-Sawing Machines, of which the following is a specification.

My invention relates to that type of metal sawing machines in which a series of metal bars piled one on top of another are subjected to the action of a metal cutting saw whereby the bars are cut through transversely, the object of my invention being to provide simple and effective means for retaining a pile of bars in curved relation to the saw, and preferably in curved relation conforming to the periphery of the saw blade, so that the saw will act upon all of the bars simultaneously and the cut will be completed with the minimum amount of forward feed movement of the saw in respect to the bars or of the bars in respect to the saw. This object I attain in the manner hereinafter set forth, reference being had to the accompanying drawing, in which—

Figure 1 is a sectional view of a pile of bars showing my improved means for maintaining them in curved relation, and also showing the saw whereby the cutting of the bars is effected, said saw being shown in retracted position as before it commences to make its cut; Fig. 2 is a similar view showing the cut partially completed, and Fig. 3 is a sectional plan on the line a—a, Fig. 1.

In the drawing, 1 represents the saw and 2 the pile of bars to be cut thereby, these bars being disposed between opposite jaws 3 and 4, that face of the jaw 3 which is in contact with the bars being of convex formation and that face of the jaw 4 which contacts with the bars being of concave formation, so that the pile of bars will be disposed in curved relation to the saw, the pile of bars being confined vertically by a clamp screw 5 adapted to a threaded opening in a cross bar 6 pivotally mounted upon a bolt 7 projecting upwardly from the jaw 4 and engaging a bolt 8 projecting upwardly from the jaw 3, these bolts being provided at their upper ends with nuts 9 bearing against the top of the cross bar 6 so as to maintain the latter in proper vertical relation to the jaws 3 and 4.

The jaws 3 and 4 project upwardly from a base structure 10 which is mounted so as to slide longitudinally upon rails 11, although this is not essential to the proper carrying out of my invention, as said base structure may be fixed and the saw may be caused to move from and toward the bars, or both base structure and saw may be mounted so as to move from and toward one another.

The curved relation of the pile of bars is preferably such as to accord with the peripheral contour of the saw so that the latter acts upon all of the bars simultaneously, as shown in Fig. 2, and the extent of feed movement of the bars or saw during the cutting operation need not exceed the diameter of the bars.

In severing long bars two laterally separated pairs of holding jaws 3 and 4 are provided, these jaws being by preference mounted upon the same base structure 10, as shown in Fig. 3, but where the bars are short or where narrow slices are being cut from the ends of the bars one pair of holding jaws will generally be sufficient.

I claim:

1. The combination, in a work holder for metal cutting saws, of a pair of jaws between which the bars to be cut are piled, one of said jaws having its bar engaging face of convex contour and the opposite jaw having its bar engaging face of concave contour, the saw, and means for effecting relative movement between the saw and pile in a direction transversely of the pile.

2. The combination, in a work holder for metal cutting saws, of a pair of jaws between which the bars to be cut are piled, one of said jaws having its bar-engaging face of convex contour and the opposite jaw having its bar-engaging face of concave contour, and means for imparting downward pressure to the top bar so as to maintain the pile of bars in place between the jaws.

3. The combination, in a metal cutting machine, of the cutting saw, and a pair of bar holding jaws disposed one on each side of said saw, the bars extending from one of said pairs of jaws to the other across the path of the cutting saw, and means for causing the pile of bars to assume a curved contour conforming to that of the periphery of the saw.

4. The combination, in a metal cutting machine, of the cutting saw, and a pair of bar holding jaws disposed one on each side of said saw, the bars extending from one of said pairs of jaws to the other across the path of the cutting saw, means for causing the pile of bars to assume a curved contour conforming to that of the periphery of the saw, and a slidably mounted base structure carrying said jaws.

5. The combination, in a metal cutting machine, of the cutting saw, a work holding jaw having a curved face conforming substantially to the periphery of the saw, and means for maintaining a pile of bars with one face of each bar in contact with said curved face of the jaw.

In testimony whereof, I have signed my name to this specification, in the presence of two subscribing witnesses.

WM. H. LUCAS.

Witnesses:
KATE A. BEADLE,
HAMILTON D. TURNER.

Copies of this patent may be obtained for five cents each, by addressing the "Commissioner of Patents Washington, D. C."